(12) United States Patent
Jeon

(10) Patent No.: US 9,146,583 B2
(45) Date of Patent: Sep. 29, 2015

(54) DISPLAY DEVICE

(71) Applicant: LG Display Co., Ltd., Seoul (KR)

(72) Inventor: Min Ho Jeon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/565,601

(22) Filed: Dec. 10, 2014

(65) Prior Publication Data

US 2015/0168995 A1     Jun. 18, 2015

(30) Foreign Application Priority Data

Dec. 12, 2013  (KR) ......................... 10-2013-0154395

(51) Int. Cl.
  *G02F 1/1333*   (2006.01)
  *G06F 1/16*    (2006.01)
  *G06F 1/18*    (2006.01)

(52) U.S. Cl.
  CPC ........ *G06F 1/1601* (2013.01); *G02F 1/133308* (2013.01); *G06F 1/1637* (2013.01); *G06F 1/182* (2013.01); *G02F 2001/133311* (2013.01)

(58) Field of Classification Search
  CPC .............. G02F 1/133308; G02F 2001/133311; G02F 2001/133317; G09F 15/0012; H05K 5/0213; H05K 3/361; G06F 1/1637

USPC ............. 361/679.22, 679.24; 349/58, 65, 187
See application file for complete search history.

(56) References Cited

U.S. PATENT DOCUMENTS

| | | | |
|---|---|---|---|
| 5,353,536 A * | 10/1994 | Erber et al. ................... | 40/606.1 |
| 7,667,964 B2 * | 2/2010 | Kang et al. .................... | 361/692 |
| 8,320,119 B2 * | 11/2012 | Isoshima et al. ......... | 361/679.47 |
| 8,681,488 B2 * | 3/2014 | Maeyama ................ | 361/679.21 |
| 2004/0007373 A1 * | 1/2004 | Higuchi et al. .................. | 174/50 |
| 2005/0178576 A1 * | 8/2005 | Saka et al. ...................... | 174/66 |
| 2007/0117418 A1 * | 5/2007 | Azuma et al. ................... | 439/67 |
| 2007/0188675 A1 * | 8/2007 | Tsubokura et al. ............. | 349/58 |

* cited by examiner

*Primary Examiner* — Adrian S Wilson
*Assistant Examiner* — Abhishek Rathod
(74) *Attorney, Agent, or Firm* — Morgan, Lewis & Bockius LLP

(57) ABSTRACT

A display device capable of discharging liquid includes a display panel for displaying an image; a panel driver coupled to the display panel configured to drive the display panel; and a guide frame coupled to a rear surface of the display panel and supporting the display panel, wherein the guide frame defines a circuit arrangement space to accommodate the panel driver, and the guide frame has at least one liquid discharging opening through which liquid in the circuit arrangement space is discharged to an outside of the display device.

20 Claims, 8 Drawing Sheets

DISPLAY DEVICE

The present invention claims the benefit of the Korean Patent Application No. 10-2013-0154395 filed in Korea on Dec. 12, 2013, which is hereby incorporated by reference in its entirety.

BACKGROUND OF THE INVENTION

1. Field of the Invention

The present disclosure relates to a display device for displaying an image, and more particularly, to a display device for discharging liquid that flows into the inside.

2. Discussion of the Related Art

Display devices such as liquid crystal displays (LCDs), plasma display panels (PDPs), and organic light emitting displays (OLEDs) have been developed to replace cathode ray tubes that are initial display devices.

FIG. 1 is a cross-sectional view schematically illustrating a related art display device.

With reference to FIG. 1, the related art display device 1 includes a display panel 2 that displays an image, a guide frame 3 that supports the display panel 2, an upper cover 4 that surrounds a front edge of the display panel 2 and a side of the guide frame 3, and a panel driver 5 that drives the display panel 2. One side of the panel driver 5 is coupled to the display panel 2, and the other side is disposed at a side of the guide frame 3.

However, the related art display device brings about a problem in that the panel driver 5 and the other metal elements are corroded by liquid L that flows into the inside, such as during cleaning of the screen, through a space between a front surface of the display panel 2 and the upper cover 4.

SUMMARY OF THE INVENTION

Accordingly, the present invention is directed to a display device that substantially obviates one or more problems due to limitations and disadvantages of the related art.

An object of the present invention is to provide a display device that prevents a panel driver from being corroded by liquid that flows into the inside.

Additional features and advantages of the invention will be set forth in the description which follows, and in part will be apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purposed of the present invention, as embodied and broadly described, a display device capable of discharging liquid includes a display panel for displaying an image; a panel driver coupled to the display panel configured to drive the display panel; and a guide frame coupled to a rear surface of the display panel and supporting the display panel, wherein the guide frame defines a circuit arrangement space to accommodate the panel driver, and the guide frame has at least one liquid discharging opening through which liquid in the circuit arrangement space is discharged to an outside of the display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Figure 1:
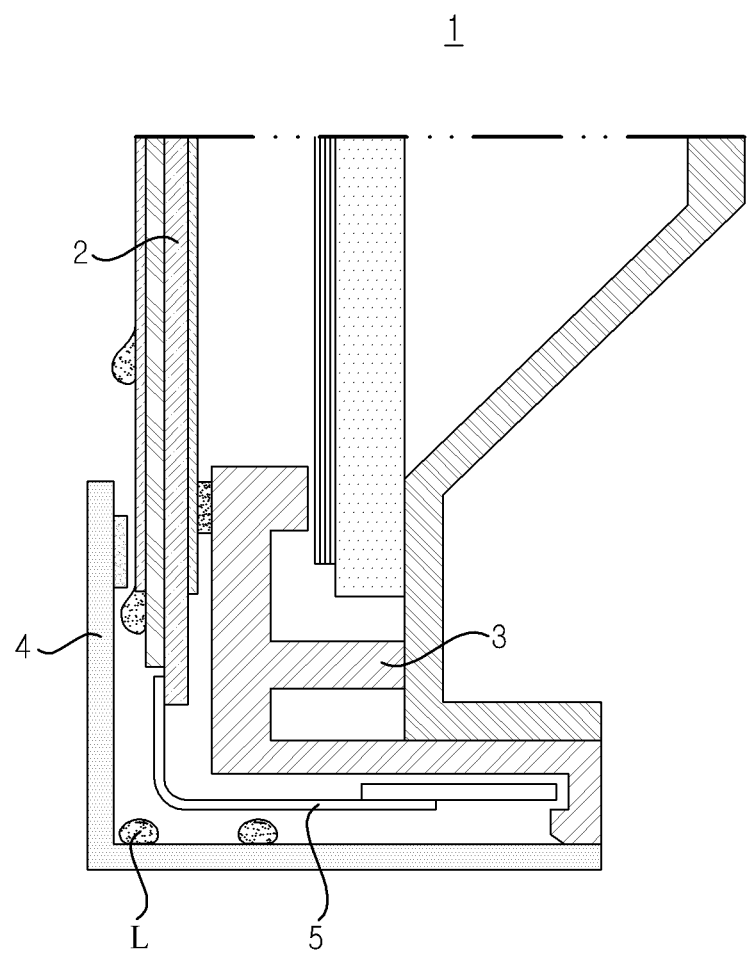
FIG. 1 is a cross-sectional view schematically illustrating a related art display device.

Reference will now be made in detail to the exemplary embodiments of the present invention, examples of which are illustrated in the accompanying drawings. Wherever possible, the same reference numbers will be used throughout the drawings to refer to the same or like parts.

In the specification, in adding reference numerals for elements in each drawing, it should be noted that like reference numerals already used to denote like elements in other drawings are used for elements wherever possible.

The terms described in the specification should be understood as follows.

As used herein, the singular forms "a," "an," and "the" are intended to include the plural forms as well, unless the context clearly indicates otherwise. The terms "first" and "second" are for differentiating one element from the other element, and these elements should not be limited by these terms. It will be further understood that the terms "comprises," "comprising," "has," "having," "includes," and/or "including," when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, a display device according to exemplary embodiments will be described in detail with reference to the accompanying drawings.

Figure 2A:
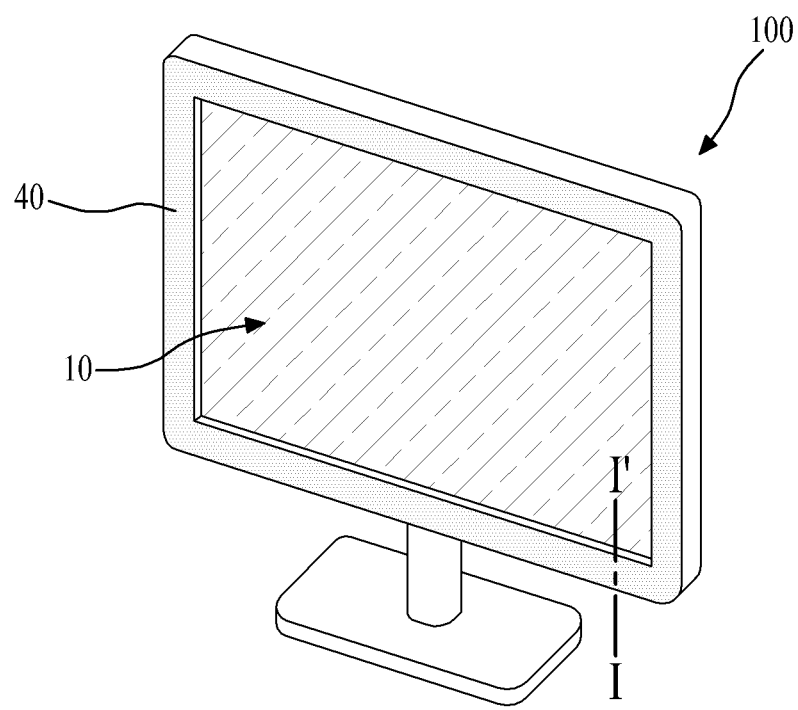
FIG. 2A is a perspective view illustrating a display device according to an example embodiment of the present invention.
Figure 2B:
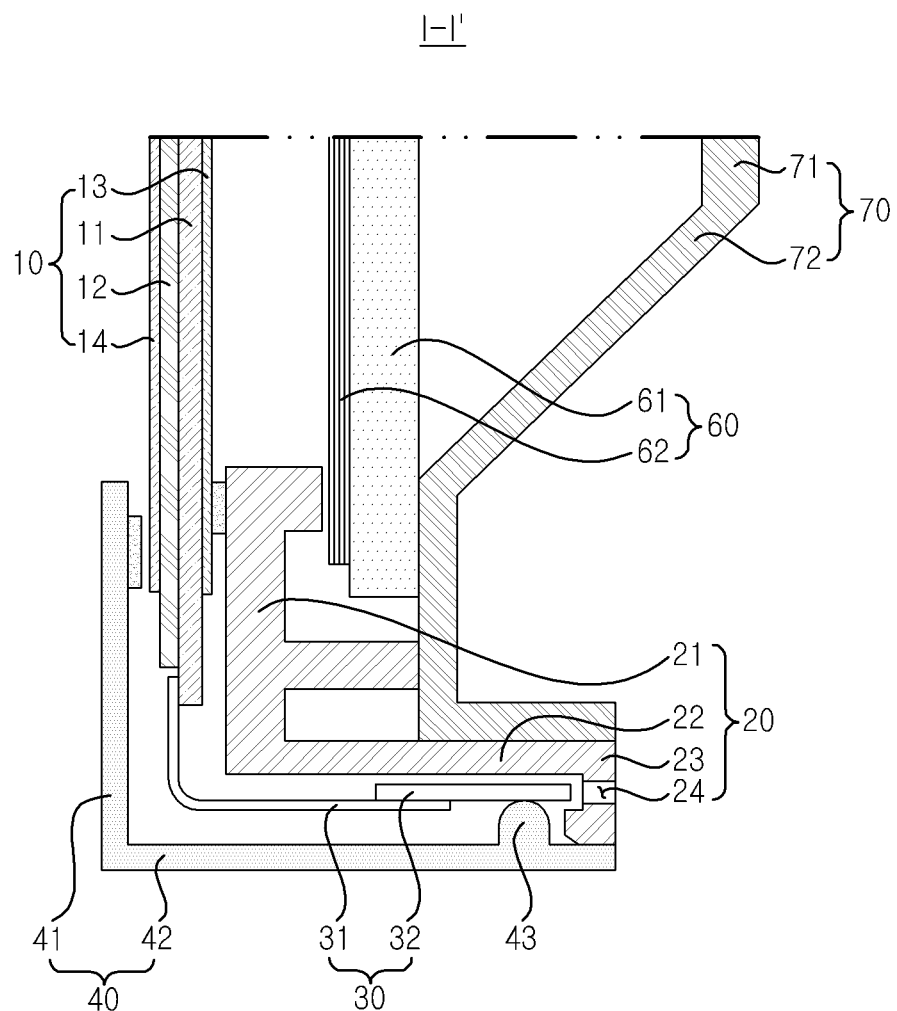
FIG. 2B is a cross-sectional view illustrating a display device according to an example embodiment of the present invention.

FIGS. 2A and 2B are perspective and cross-sectional views illustrating a display device according to an example embodiment. With reference to FIGS. 2A and 2B, a display device 100 includes a display panel 10, a guide frame 20, a panel driver 30, and an upper cover 40.

The display panel 10 displays an image, and may be a liquid crystal display panel, which includes a liquid crystal layer formed between a lower substrate 11 and an upper substrate 12, or an organic light emitting display panel that includes an organic light emitting element.

For example, the display panel 10 that is the liquid crystal display panel adjusts a transmittance of light irradiated from a backlight unit 60 that emits light, thereby displaying an image. To this end, the display panel 10 includes the lower substrate 11, the upper substrate 12, an upper film member 14, and a lower polarizing member 13.

The lower substrate 11 may include a plurality of pixels (not shown) that are respectively formed in intersection areas between a plurality of gate lines (not shown) and a plurality of data lines (not shown). Each of the plurality of pixels may include a thin film transistor (TFT, not shown) connected to a gate line and a data line, a pixel electrode connected to the TFT, and a common electrode that is formed adjacent to the pixel electrode and receives a common voltage. The lower substrate 11 generates an electric field, corresponding to a difference voltage between a data voltage, which is applied to each pixel, and the common voltage, to adjust a light transmittance of the liquid crystal layer.

The upper substrate 12 may include a color filter corresponding to each pixel that is formed on the lower substrate 11, and is facing-coupled to the lower substrate 11 with the liquid crystal layer formed therebetween. The common electrode (not shown), which receives the common voltage, may be formed on the upper substrate 12 depending on a driving mode of the liquid crystal layer. The upper substrate 12 filters light, which is incident through the liquid crystal layer, to emit color light to the outside, thereby allowing a color image to be displayed by the display panel 10.

Detailed configurations of the lower substrate 11 and the upper substrate 12 may be provided in various types known to those skilled in the art depending on a driving mode of the liquid crystal layer, for example, a twisted nematic (TN) mode, a vertical alignment (VA) mode, an in-plane switching (IPS) mode, or a fringe field switching (FFS) mode.

The upper film member adheres to a top of the upper substrate 12. The upper film member may be configured with an upper polarizing member that polarizes light that passes through the upper substrate 12 and is emitted to the outside. Alternatively, the upper film member may include the upper polarizing member and an optical member (not shown) for a 3D image that is disposed on the upper polarizing member.

The lower polarizing member adheres to a bottom of the lower substrate 11. The lower polarizing member polarizes light that is incident from the backlight unit 60, and irradiates the polarized light onto the lower substrate 11.

The guide frame 20 supports the display panel 10, and may include a panel supporting part 21 coupled to a rear surface of the display panel 10 and a guide side wall 22 coupled to the panel supporting part 21. The panel supporting part 21 is formed in a hollow ring shape so as to support a rear edge of the display panel 10. The guide side wall 22 is formed in a hollow ring shape, and is coupled to the panel supporting part 21 in a shape that is bent vertically from the panel supporting part 21. That is, the guide frame 20 may have a ⌐-shaped cross-sectional surface, or have a ⌙-shaped cross-sectional surface depending on the kind of the display device 100. In the guide frame 20, the guide side wall 22 surrounds a side of the display panel 10, a side of the backlight unit 60, or a side of the lower cover 70, and the panel supporting part 21 may be formed to protrude from an inner surface of the guide side wall 22.

Figure 3:
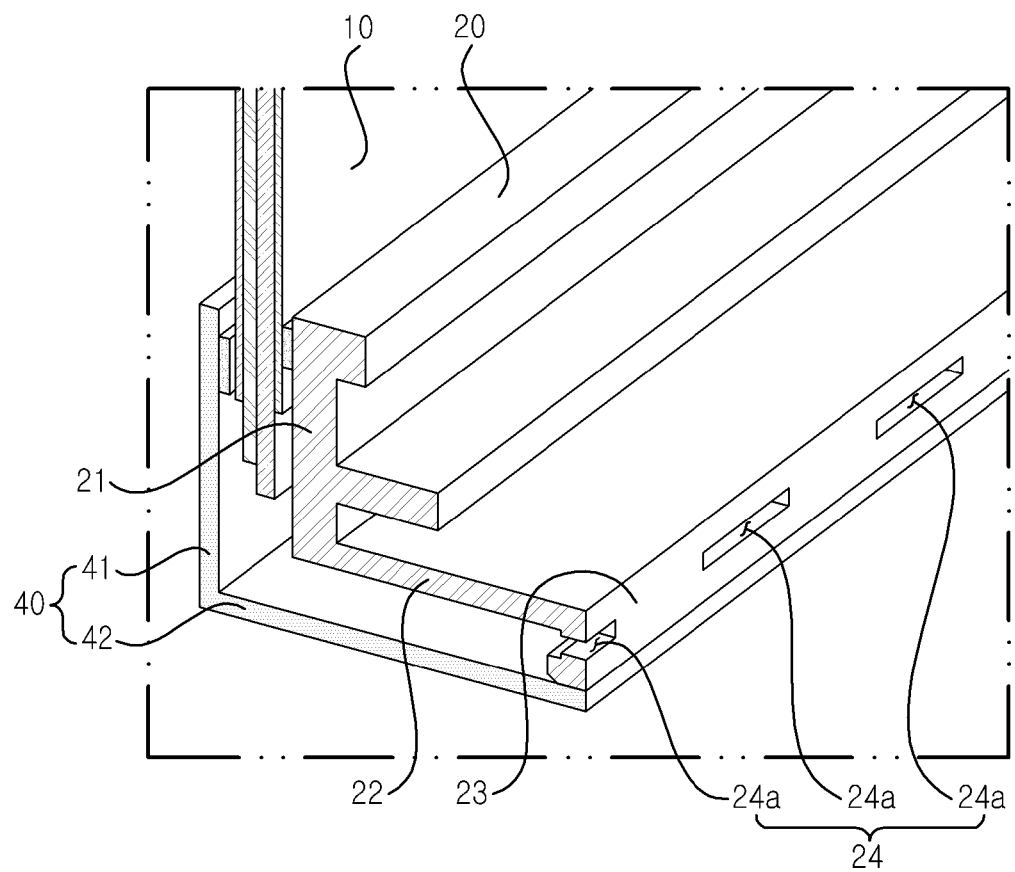
FIG. 3 is a perspective view illustrating a liquid discharging part according to an example embodiment of the present invention.

As shown in FIG. 3, the guide frame 20 may further include an interval maintaining part 23 that protrudes from the guide side wall 22 to the upper cover 40. The interval maintaining part 23 has a shape that is bent from one end of the guide side wall 22 to an outer side, and a circuit arrangement space S in which the panel driver 30 is accommodated is provided between the guide side wall 22 and the upper cover 40.

As shown in FIG. 2B, the panel driver 30 drives the display panel 10, and may include a driving circuit film 31 and a printed circuit board (PCB) 32.

The driving circuit film 31 may use a chip-on film (COF), and include a driving integrated circuit (IC) that generates data signals and a gate signal for driving the pixels of the display panel 10, respectively supplies the data signals to the data lines, and sequentially supplies the gate signal to the gate lines.

The PCB 32 may be configured with a source PCB and a gate PCB, and may use a flexible PCB (FPCB). The PCB 32 may include a plurality of driving elements, which supply image data and a timing sync signal to the driving IC, and a protective cap (not shown) that covers the driving elements.

The protective cap covers the driving elements disposed on the PCB 32, thereby protecting the driving elements, supporting the display panel 10, and preventing an electrical connection between the driving elements.

The driving IC is mounted on the driving circuit film 31 by a chip bonding process or a surface mounting process, and is bonded to a plurality of signal supply terminals and a plurality of signal input terminals (not shown). The driving IC generates data signals and the gate signal on the basis of video data and the timing sync signal that are supplied from the outside through the plurality of signal input terminals (not shown), and respectively supplies the generated data signals and gate signal to corresponding signal supply terminals to drive the pixels of the display panel 10, thereby displaying an image corresponding to the video data.

Since the driving element is disposed at the driving circuit film 31, the panel driver 30 may be configured with only the driving circuit film 31, or may be configured in another type.

The driving circuit film 31 is coupled to the display panel 10, namely, a pad part that is provided at an edge of the lower substrate 11, and is bent toward a side of the guide frame 20. The PCB 32 is coupled to the driving circuit film 31, and is disposed at the side of the guide frame 20.

The upper cover 40 is bent to surround a front edge of the display panel 10 and the panel driver 30. The upper cover 40 may include a front cover part 41, which is opposite to a front surface of the display panel 10 and surrounds the frond edge of the display panel 10, and a side cover 42 that is bent from the front cover part 41 and surrounds the guide side wall 22 and the panel driver 30. The front cover part 41 is formed in a hollow ring shape, and supports only an edge of the display panel 10. The side cover 42 is formed in a hollow ring shape, and is coupled to the front cover part 41 in a bent shape. That is, the upper cover 40 may have a ⌐-shaped cross-sectional surface. Here, one end of the side cover 42 is connected (or coupled) to the interval maintaining part 23 of the guide frame 20, and the circuit arrangement space S is formed by the guide side wall 22, the interval maintaining part 23, and the side cover 42.

The upper cover 40 may further include a fixing projection 43 that protrudes the panel driver 30 to adhere to the guide frame 20, thereby fixing the panel driver 30. The fixing projection 43 is formed to protrude from the side cover 42 toward the guide side wall 22. The PCB 32 may be disposed higher in position than the side cover 42 by the fixing projection 43 so that the PCB 32 does not contact the side cover 42.

FIG. 3 is a perspective view illustrating a liquid discharging part according to an example embodiment of the present invention.

With reference to FIGS. 2 and 3, the guide frame 20 may further include a liquid discharging part 24.

The liquid discharging part 24 discharges liquid L, which flows into the circuit arrangement space S, to the outside, and is provided at the interval maintaining part 23. The liquid discharging part 24 is formed to pass through the interval maintaining part 23, and allows the circuit arrangement space S to communicate with the outside of the display device 100.

When the front cover part 41 pressurizes the display panel 10 due to an external force, a leakage of light occurs in the display panel 10. To prevent the light leakage, the front cover part 41 is disposed to be separated by a certain distance from a front surface of the display panel 100. Unlike the related art, where liquid L flows into the inside through a space between the display panel 10 and the upper cover 40, and corrodes the panel driver 30 that is accommodated in the circuit arrangement space S, in the display device 100 according to an example embodiment, the liquid discharging part 24 discharges the liquid L, thereby preventing the panel driver 30 from being continuously exposed to a humid environment and from being corroded. Also, the display device 100 according to the example embodiment can prevent other metal elements from being corroded.

In detail, the liquid discharging part 24 may include at least one discharging hole 24a that is formed to pass through the interval maintaining part 23. When the interval maintaining part 23 is provided with a plurality of discharging holes 24a, the plurality of discharging holes 24a may be arranged along a long-direction length of the interval maintaining part 23 and are separated from each other.

Figure 4:
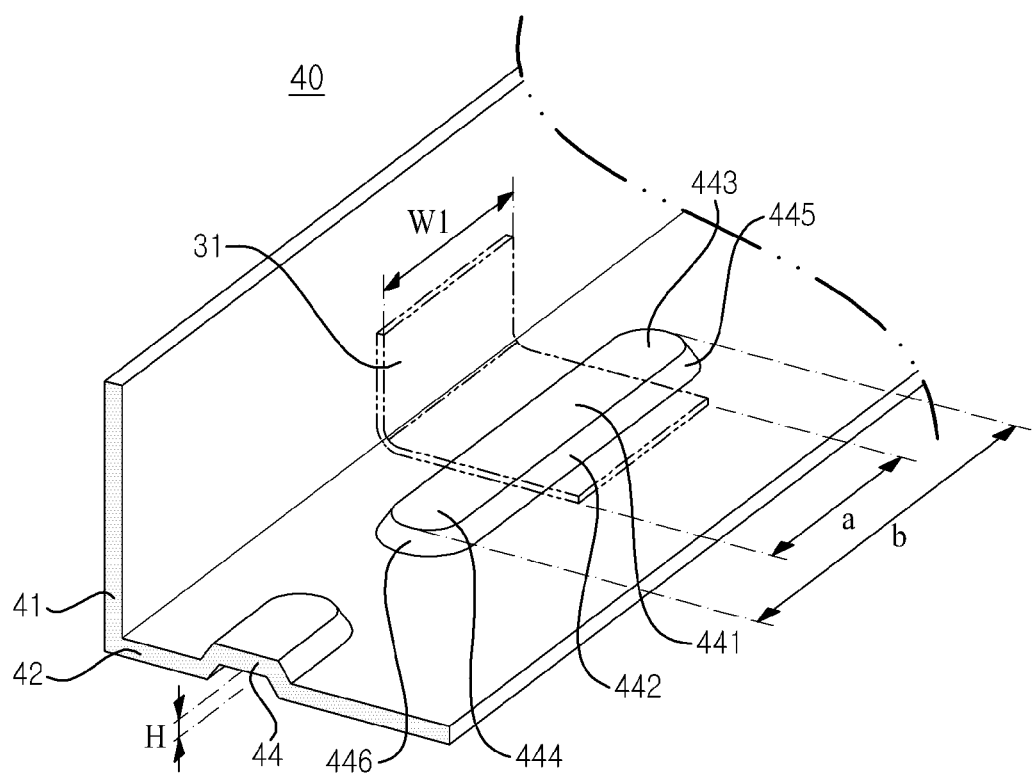
FIG. 4 is a perspective view illustrating an upper cover according to an example embodiment of the present invention.

FIG. 4 is a perspective view illustrating the upper cover according to an example embodiment of the present invention.

With reference to FIG. 4, the display device 100 according to the example embodiment may further include a protrusion part 44.

The protrusion part 44 is high formed in a direction from an inner surface of the side cover 42 to the guide side wall 22 so that liquid L flows to detour the driving circuit film 31. The protrusion part 44 may be formed in each arrangement area of the driving circuit film 31. Therefore, the liquid L is guided and moved to an outer surface of the protrusion part 44, and thus moves to avoid the arrangement area of the driving circuit film 31. Accordingly, the protrusion part 44 prevents the liquid L from approaching the arrangement area of the driving circuit film 31, and thus can better prevent the driving circuit film 31 and the PCB 32 from being corroded.

In detail, the protrusion part 44 may include an opposite portion 441, which is opposite to the panel driver 30, and an induction portion 442 that allows the opposite portion 441 to be disposed higher than the side cover 42 so as to prevent the liquid L from flowing to the opposite portion 441.

The opposite portion 441 may be formed to have the same or corresponding width "a" as a width W1 of the driving circuit film 31. Also, the opposite portion 441 is disposed at a higher position H than that of the side cover 42 by the induction portion 442.

The induction portion 442 induces a flow path F of the liquid L, and denotes an outer surface of the protrusion part 44. The induction portion 442 prevents the liquid L from upward flowing to the opposite portion 441 due to gravity, and blocks the flow path F of the liquid L in order for the liquid L to flow to a periphery thereof. The induction portion 442 allows the opposite portion 441 to be disposed at the higher position H than that of the side cover 42, and thus, the opposite portion 441 may be formed like a slope. Accordingly, the liquid L cannot approach the driving circuit film 31 that is disposed above the opposite portion 441.

The protrusion part 44 may be used for dissipating heat, which is generated in driving the panel driver 30, to the outside. To this end, the protrusion part 44 may be formed of a metal material having high thermal conductivity. Alternatively, an entirety of the upper cover 40 may be formed of a metal material identically to the protrusion part 44. The protrusion part 44 is adjacent to (or contacts) the panel driver 30. Therefore, heat is conducted from the panel driver 30 to the protrusion part 44, and the conducted heat is dissipated from the entirety of the upper cover 40 to the outside.

The protrusion part 44 may further include first and second extension portions 443 and 444, and first and second connection portions 445 and 446 that are respectively connected to the first and second extension portions 443 and 444.

The first and second extension portions 443 and 444 may respectively extend from both sides of the opposite portion 441. Therefore, a top of the protrusion part 44 corresponds to the sum of an area of the opposite portion 441 and areas of the first and second extension portions 443 and 444, and is thus formed to have a greater width b than the width W1 of the driving circuit film 31.

The first and second connection portions 445 and 446 allow the first and second extension portions 443 and 444 to be disposed at a higher position than that of the side cover 42, and may be respectively connected to both sides of the induction portion 442. Thus, a detour radius of the liquid L is increased by such an enlarged protrusion part 44, and the liquid L is guided farther away from the driving circuit film 31. Accordingly, the protrusion part 44 can more effectively prevent the driving circuit film 31 from being corroded by the liquid L.

As described above, the protrusion part 44 may be formed to have a width equal to or greater than the width W1 of the driving circuit film 31.

Figure 5:
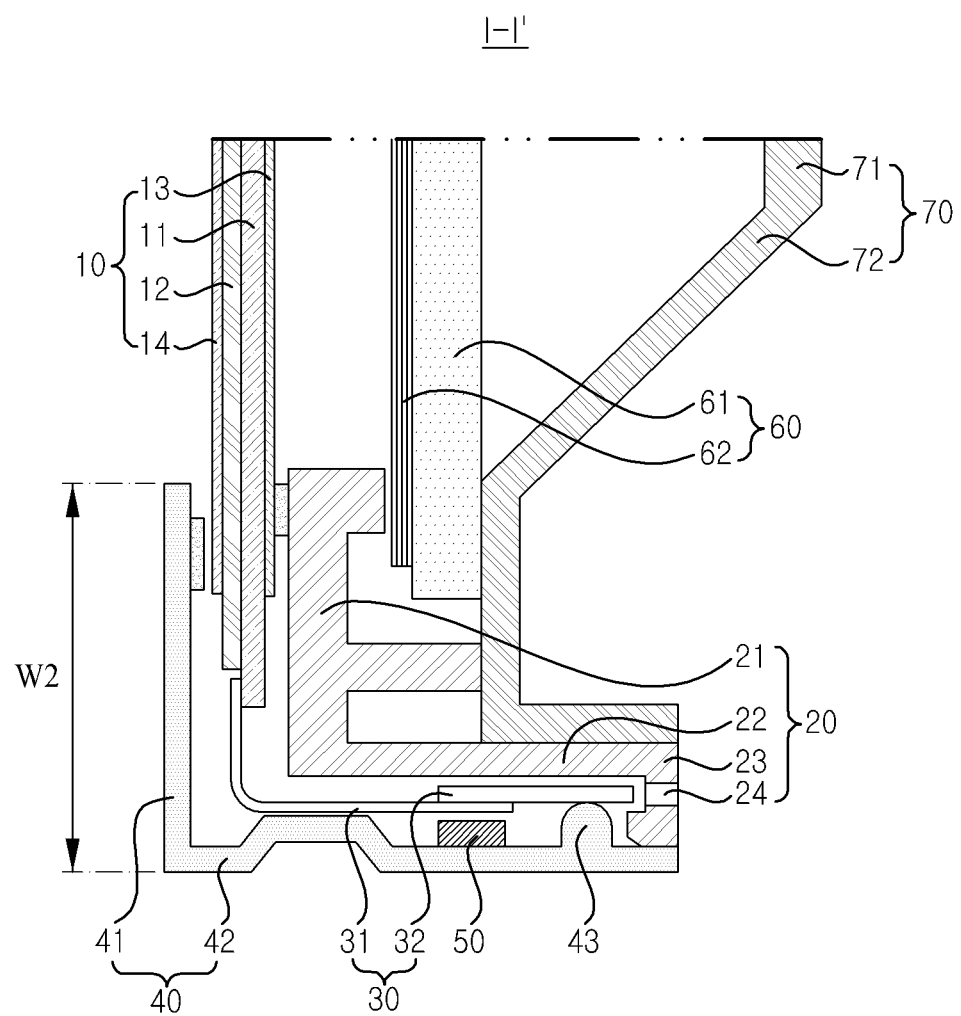
FIG. 5 is a cross-sectional view illustrating that a moisture absorbing member is included in a display device according to an example embodiment of the present invention.

FIG. 5 is a cross-sectional view illustrating that a moisture absorbing member is included in the display device 100 according to an embodiment of the present invention.

With reference to FIG. 5, the display device 100 according to an example embodiment of the present invention may further include a moisture absorbing member 50 coupled to an inner surface of the upper cover 40.

The moisture absorbing member 50 absorbs liquid L that flows into the inside through a space between the display panel 10 and the upper cover 40. The moisture absorbing member 50 may be disposed between the guide frame 20 and the upper cover 40, and for example, may be disposed under the panel driver 30.

Figure 6:
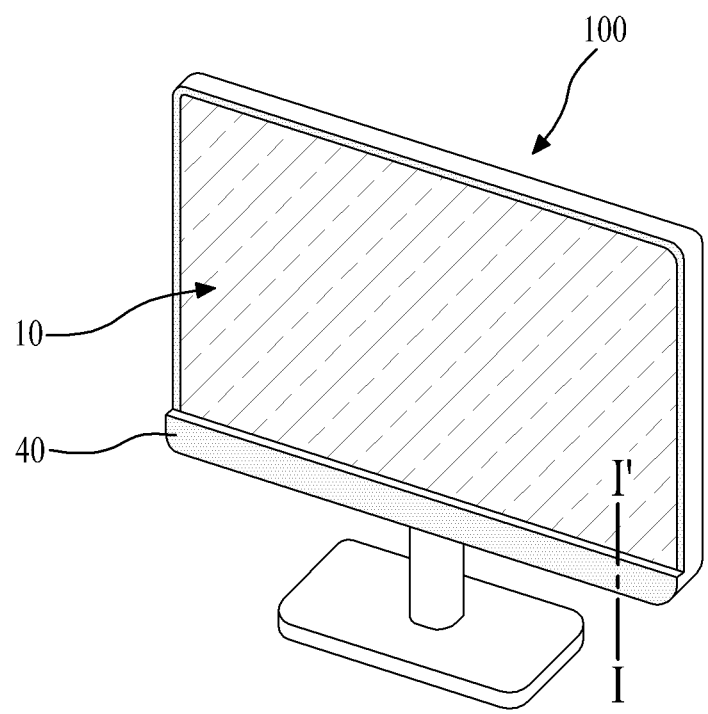
FIG. 6 is a perspective view illustrating a display device according to another example embodiment of the present invention.

As shown in FIG. 6, in the display device 100 according to an example embodiment, the upper cover 40 may be formed to surround only a lower side among an upper side, both sides, and a lower side of the display panel 10. Accordingly, in such a display device 100, the upper cover 40 effectively supports a weight of the display panel 10 that is given in a gravity direction, and a bezel width W2 can be reduced.

As described above, when the display panel 10 is a liquid crystal display panel, the display device 100 according to an example embodiment is a non-emissive type that is supplied with light by a separate element, and thus may further include the backlight unit 60 and the lower cover 70.

The backlight unit 60 irradiates light onto the display panel 10, and may include a light source module (not shown) and a diffusive plate 61 (or a light guide frame).

The lower cover 70 includes a supporting plate 71 and a supporting side wall 72, so as to accommodate the backlight unit 60. The supporting plate 71 is formed in a plate shape. The supporting side wall 72 is coupled to an outer portion of the supporting plate 71 so as to be bent. The lower cover 70 may be formed of a material having high durability and heat resistance. The lower cover 70 may support the guide frame 20.

The lower cover 70 may be formed in another structure depending on the kind of the display device 100. To provide a description on a direct type LCD device as an example, the supporting plate 71 supports the light source module, and may further include a reflective sheet (not shown) that reflects light irradiated from the light source module. The supporting side wall 72 may support the diffusive plate 61.

The light source module is disposed at a bottom of the lower cover 70 to irradiate light, and may include a light source circuit unit and a light emitting diode (LED) array.

The light source circuit unit is disposed at the bottom of the supporting plate 71. The light source circuit unit includes a driving power line through which a driving power is supplied from the outside, and supplies a power, supplied from the outside, to the LED array through the driving power line.

The LED array is configured by coupling a plurality of LED packages to a board, and each of the LED packages includes an LED chip, which emits light with power, and a lens that diffuses the light, emitted from the LED chip, to the outside.

Therefore, the light source module may be disposed to be opposite to a lower side of the diffusive plate 61, and may directly irradiate the light onto a bottom of the diffusive plate 61.

The diffusive plate 61 is supported by the lower cover 70, namely, the supporting side wall 72, and diffuses the light incident from the light source module to output the diffused light to the outside. The diffusive plate 61 may include a plurality of beads (a diffusive bead and a haze bead) for diffusing the light. The diffusive plate 61 may be disposed to be opposite to the supporting plate 71, the light source module, and the reflective sheet, and in particular, may be disposed in parallel with the light source module so as to maintain a distance between the diffusive plate 61 and the light source module. Therefore, an optical gap between the light source module and the diffusive plate 61 is maintained without any change, thereby maintaining a light uniformity of the backlight unit 60.

A plurality of optical sheets 62, which enhance a luminance characteristic of the light passing through the diffusive plate 61, may be disposed at a top of the diffusive plate 61. The plurality of optical sheets 62 may be sheets having a prism shape, a lenticular lens shape, or a micro-lens shape. Each of the optical sheets 62 may include a sub-material such as a bead, for enhancing an optical effect.

To provide a description on an edge type LCD device as an example, although not shown, a supporting plate supports the reflective sheet and a light guide frame, and a light source module may be disposed at a side of a supporting side wall.

The light source module irradiates light onto a side of the light guide frame, which refracts the light incident through the side to guide the refracted light to the display panel 10. A plurality of optical sheets 62, which enhance a luminance characteristic of the light, may be disposed at a top of the light guide frame.

Figure 7:
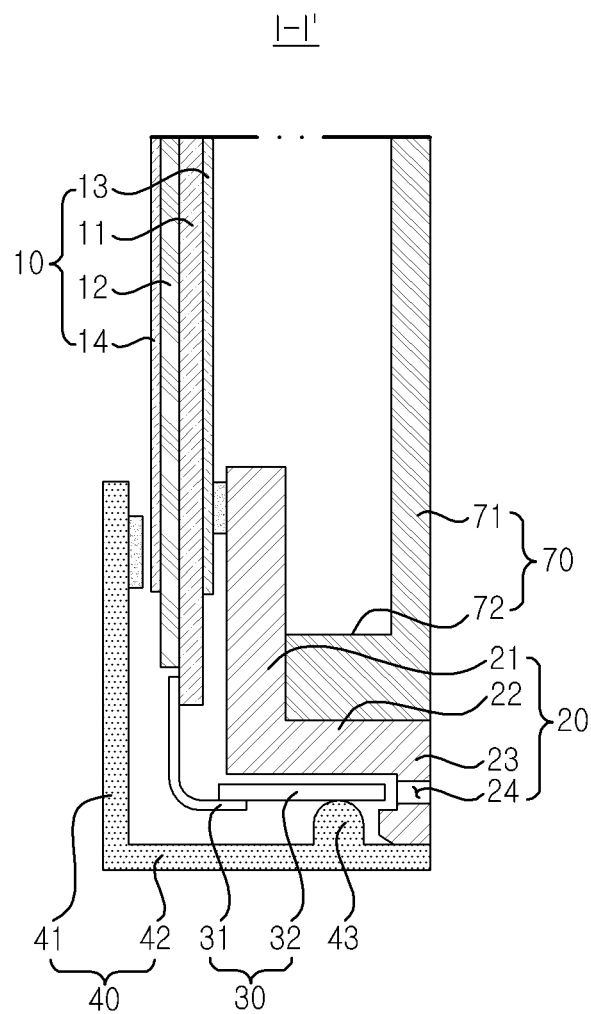
FIG. 7 is a cross-sectional view illustrating a display device according to another example embodiment of the present invention.

The LCD device has been described above as an example of the display device 100 according to the example embodiments, but the display device 100 according to the example embodiments is not limited to the LCD device. For example, various flat panel display devices such as an organic light emitting display (OLED) device may be used as the display device 100, as shown in FIG. 7. For example, the display panel 10 may be an organic light emitting display panel including an organic light emitting element 12. In the display device 100 including the organic light emitting display panel, the organic light emitting element 12 is provided on the lower substrate 11, and the panel driver 30 connected to the lower substrate 11 drives the organic light emitting element, thereby displaying an image by using light that is output to the outside through the lower substrate 11 or the upper substrate 12. In this case, a backlight unit may be omitted, and thus, the lower cover 70 supports the guide frame 20, and surrounds a rear surface of the display panel 10.

As described above, the present invention can effectively discharge liquid which flows into the inside, thereby preventing the panel driver and the other metal elements from becoming corroded. As a result, a durability of a display device is enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device capable of discharging liquid, comprising:
   a display panel for displaying an image;
   a panel driver coupled to the display panel configured to drive the display panel; and
   a guide frame including a panel supporting part coupled to a rear surface of the display panel and supporting the display panel, a guide side wall that surrounds a side of the display panel, and an interval maintaining part that protrudes from the guide side wall,
   wherein the guide frame defines a circuit arrangement space to accommodate the panel driver, and the interval maintaining part of the guide frame has at least one liquid discharging opening through which liquid in the circuit arrangement space is discharged to an outside of the display device.

2. The display device according to claim 1, wherein the at least one liquid discharging opening includes a plurality of liquid discharging openings formed on the interval maintaining part and separated from each other at a regular interval.

3. The display device according to claim 1, further comprising an upper cover including a front cover part that covers a front edge of the display panel and a side cover part that covers the guide frame and the panel driver.

4. The display device according to claim 3, wherein the front cover part covers an edge along a bottom edge of the display panel.

5. The display device according to claim 3, wherein the front cover part covers edges along an entire periphery of the display panel.

6. The display device according to claim 3, wherein the circuit arrangement space is defined between the guide side wall and the side cover part.

7. The display device according to claim 3, wherein the interval maintaining part protrudes from the guide side wall to the side cover part with the circuit arrangement space defined by the guide side wall, the interval maintaining part, and the side cover part.

8. The display device according to claim 3, wherein a fixing projection is formed on the side cover part and forces the panel driver toward the guide side wall to fix the panel driver.

9. The display device according to claim 3, wherein a protrusion part is formed on the side cover part extending in a direction from an inner surface of the side cover part at a position corresponding to the circuit arrangement space.

10. The display device according to claim 9, wherein,
the panel driver includes a driving circuit film which is coupled to a pad part of the display panel and is bent toward the guide side wall, and a printed circuit board which is coupled to the driving circuit film and is disposed at a side of the guide side wall, and
the protrusion part has a width larger than that of the driving circuit film.

11. The display device according to claim 1, wherein a moisture absorbing member is inside the circuit arrangement space to absorb liquid.

12. The display device according to claim 1, wherein the display panel includes a liquid crystal display panel.

13. The display device according to claim 1, wherein the display panel includes an organic light emitting display panel.

14. The display device according to claim 1, wherein the at least one liquid discharging opening is configured to discharge liquid to a rear of the display device.

15. A display device capable of discharging liquid, comprising:
a display panel for displaying an image;
a panel driver coupled to the display panel configured to drive the display panel;
a guide frame coupled to a rear surface of the display panel and supporting the display panel; and
an upper cover including a front cover part that covers a front edge of the display panel and a side cover part that covers the guide frame and the panel driver
wherein the guide frame includes a panel supporting part coupled to a rear surface of the display panel, a guide side wall that surrounds a side of the display panel, and an interval maintaining part that protrudes from the guide side wall to the side cover part such that the guide frame defines a circuit arrangement space to accommodate the panel driver, and the guide frame has at least one liquid discharging opening through which liquid in the circuit arrangement space is discharged to an outside of the display device.

16. The display device according to claim 15, wherein the at least one liquid discharging opening includes a plurality of liquid discharging openings formed on the interval maintaining part and separated from each other at a regular interval.

17. The display device according to claim 15, wherein a moisture absorbing member is inside the circuit arrangement space to absorb liquid.

18. The display device according to claim 15, wherein the display panel includes one of a liquid crystal display panel and an organic light emitting display panel.

19. The display device according to claim 15, wherein the at least one liquid discharging opening is configured to discharge liquid to a rear of the display device.

20. A display device capable of discharging liquid, comprising:
a display panel for displaying an image;
a panel driver coupled to the display panel configured to drive the display panel;
a guide frame coupled to a rear surface of the display panel and supporting the display panel; and
an upper cover including a front cover part that covers a front edge of the display panel and a side cover part that covers the guide frame and the panel driver;
wherein the guide frame includes a panel supporting part coupled to a rear surface of the display panel and a guide side wall that surrounds a side of the display panel,
wherein the guide frame defines a circuit arrangement space to accommodate the panel driver,
wherein the side cover part includes a fixing projection to force the panel driver toward the guide side wall to fix the panel driver, and
wherein the guide frame has at least one liquid discharging opening through which liquid in the circuit arrangement space is discharged to an outside of the display device.

* * * * *